(12) United States Patent
Kim

(10) Patent No.: US 7,394,485 B2
(45) Date of Patent: Jul. 1, 2008

(54) COMBINATION IMAGE-CAPTURING APPARATUS AND METHOD FOR EFFICIENTLY COMBINING A DIGITAL STILL CAMERA WITH A DIGITAL VIDEO CAMERA

(75) Inventor: Yong-Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 10/848,050

(22) Filed: May 19, 2004

(65) Prior Publication Data

US 2004/0246363 A1    Dec. 9, 2004

(30) Foreign Application Priority Data

May 20, 2003    (KR)    .................... 10-2003-0032003

(51) Int. Cl.
*H04N 5/225* (2006.01)
(52) U.S. Cl. .............. 348/220.1; 348/333.06; 348/333.07; 348/373; 348/376
(58) Field of Classification Search .................. None
See application file for complete search history.

(56) References Cited

U.S. PATENT DOCUMENTS

| | | | | |
|---|---|---|---|---|
| 4,829,384 A | * | 5/1989 | Iida et al. ................... | 348/64 |
| 6,295,088 B1 | * | 9/2001 | Tsukahara et al. ..... | 348/333.06 |
| 6,459,857 B2 | * | 10/2002 | Kawamura et al. .......... | 396/374 |
| 6,643,459 B2 | * | 11/2003 | Ota .............................. | 396/84 |
| 6,788,960 B2 | * | 9/2004 | Masutani et al. .......... | 455/556.1 |
| 6,933,981 B1 | * | 8/2005 | Kishida et al. .............. | 348/375 |
| 6,957,083 B2 | * | 10/2005 | Ikeda et al. ............... | 455/556.1 |
| 7,084,919 B2 | * | 8/2006 | Shibata et al. .......... | 348/333.06 |
| 7,111,022 B1 | * | 9/2006 | Matsumoto et al. .......... | 707/203 |
| 2004/0212709 A1 | * | 10/2004 | Lee et al. ............... | 348/333.01 |

FOREIGN PATENT DOCUMENTS

| | | |
|---|---|---|
| EP | 1422932 | 5/2004 |
| JP | 9 186914 | 7/1997 |
| JP | 10 023363 | 1/1998 |
| JP | 2002-101377 | 4/2002 |
| KR | 2000-0003088 | 1/2000 |
| KR | 2001-0031723 | 4/2001 |

* cited by examiner

*Primary Examiner*—David Ometz
*Assistant Examiner*—Usman Khan
(74) *Attorney, Agent, or Firm*—Roylance, Abrams, Berdo & Goodman, L.L.P.

(57) ABSTRACT

Disclosed is a combination image-capturing apparatus and method. A combination image-capturing apparatus according to the present invention comprises a main body, a combination image-capturing unit installed on the main body to be location-changeable that include first and second signal processing units, and first and second recording media. The combination image-capturing apparatus further comprises a mode selection switch unit for generating an operation mode signal corresponding to a selected image-capturing unit according to position changes of the combination image-capturing unit, a photo switch for generating an image-capturing trigger signal, and a control unit for controlling storage of the first and second formatted signals in the first recording medium and the second recording medium if the image-capturing trigger signal is received. Accordingly, the present invention enables one photo-switch to store images in a recording medium corresponding to each of the image-capturing units independently driven to capture the images, thereby eliminating inconvenience arises from using separate photo-switches, as well as reducing the volume of the image-capturing apparatus.

30 Claims, 11 Drawing Sheets

COMBINATION IMAGE-CAPTURING APPARATUS AND METHOD FOR EFFICIENTLY COMBINING A DIGITAL STILL CAMERA WITH A DIGITAL VIDEO CAMERA

CROSS-REFERENCE TO RELATED APPLICATIONS

This application claims benefit under 35 U.S.C. §119(a) of Korean Patent Application No. 2003-32003, filed on May 20, 2003 in the Korean Intellectual Property Office, the entire contents of which are incorporated herein by reference.

BACKGROUND OF THE INVENTION

1. Field of the Invention

The present invention relates to a combination image-capturing apparatus and a method of operation thereof. More particularly, the present invention relates to a combination image-capturing apparatus and a method of operation thereof capable of storing images in first and second recording media, respectively, corresponding to first and second image-capturing units independently driven to capture the images.

2. Description of the Related Art

In general, digital still cameras convert images captured through lenses into digital signals, and store the digital signals in a recording medium such as a hard disc or a memory card. The digital still cameras do not record captured images on film, but store them in the recording medium, and can input digital images directly to a computer without using a scanner or the like. Digital pictures generated by such digital still cameras are convenient to edit and modify due to the high compatibility with personal computers, as captured images can be sent to the personal computers by connecting the digital camera to an external computer. Furthermore, digital still cameras are easy to carry due to the similarity in structure as general cameras. Digital still cameras typically each have a lens unit, a memory unit, a signal conversion unit, a display unit, and so on. Digital still cameras are mainly used to capture still images due to the capacity of the recording medium for storing the images. While some digital still cameras have the capability of capturing moving pictures, it is difficult or impossible to take such moving pictures for a long period of time with digital still cameras. In particular, since there is no device for storing and reproducing sound, it is not appropriate to capture, store, and reproduce moving pictures with most digital still cameras. In order to satisfy consumer demands, recording/reproducing devices, such as camcorders, are widely and generally available for recording and reproducing images and sounds of a subject stored on a recording medium such as tapes.

The camcorder is provided with a lens unit, a signal conversion unit, and a deck unit for recording images taken as pictures, and reproducing images on a display unit. Such a camcorder mainly employs a cassette tape as a recording medium, and has the cassette tape loaded in the deck unit to record moving pictures. Further, the camcorder is provided with a microphone and a speaker, and can take and stores pictures in the loaded cassette tape for more than one hour. Some camcorders also have the function of capturing still images, but the camcorder is mainly used to take moving pictures since they typically have poor still image quality compared to the digital still camera. Further, the camcorder has a complicated structure with more functions than the digital still camera, so the camcorder is relatively large and expensive.

As stated above, however, in order to utilize the respective functions of both the digital still camera and the camcorder, a user has to purchase both of the products. Accordingly, such purchases are financially burdensome on consumers. Further, after the purchase, there is a troublesome problem of having to carry two products due to the individual characteristic functions of each of the two products.

In order to solve these problems, a digital camera-combined camcorder, which unites a camcorder and a digital still camera into one case, has been developed, which is referred to as "digital camera/camcorder" or "DuoCam".

In order to capture and store images in a storage medium with the DuoCam, extra and separate buttons from each other are generally required. One set of buttons are separately provided for the digital camera to capture and store images in a memory and a second set of buttons are provided for the digital camcorder to take and record pictures on a tape. When performing the image-capturing operations with the separate buttons, however, a user must check to determine if the DuoCam is in the digital camera mode or in the digital camcorder mode, and use the appropriate buttons that correspond to the particular mode of an image-capturing operation. This causes a great deal of inconvenience as well as increasing the amount of buttons required, therefore making a combined digital camera-camcorder product larger in size.

Thus, a need exists for a combined digital camera-camcorder product that does not require a dual set of buttons to operate the different functions of the digital camera and camcorder.

SUMMARY OF THE INVENTION

An object of the present invention is to substantially solve at least the above problems and/or disadvantages and to provide at least the advantages described below. Accordingly, it is an object of the present invention to provide a combination image-capturing apparatus and method. The combination image-capturing apparatus according to an embodiment of the present invention comprises a main body, a combination image-capturing unit installed on the main body to be location-changeable, first and second signal processing units and first and second recording media. The combination image-capturing apparatus further comprises a mode selection switch unit for outputting an operation mode signal corresponding to a selected image-capturing unit according to position changes of the combination image-capturing unit, a photo switch for outputting an image-capturing trigger signal, and a control unit for controlling storage of the first and second formatted signals in the first recording medium and the second recording medium respectively if the image-capturing trigger signal is received.

Therefore, the combination image-capturing apparatus according to an embodiment of the present invention enables one photo-switch to store images in a recording medium corresponding to each of the image-capturing units independently driven to capture the images, thereby eliminating any inconvenience that a user may experience when using a separate photo-switch, as well as reducing the size of the image capturing apparatus.

BRIEF DESCRIPTION OF THE DRAWINGS

The various objects, advantages and novel features of the present invention will be best understood by reference to the detailed description of the preferred embodiments which follows, when read in conjunction with the accompanying drawings, in which.

DETAILED DESCRIPTION OF THE PREFERRED EMBODIMENTS

Figure 1:
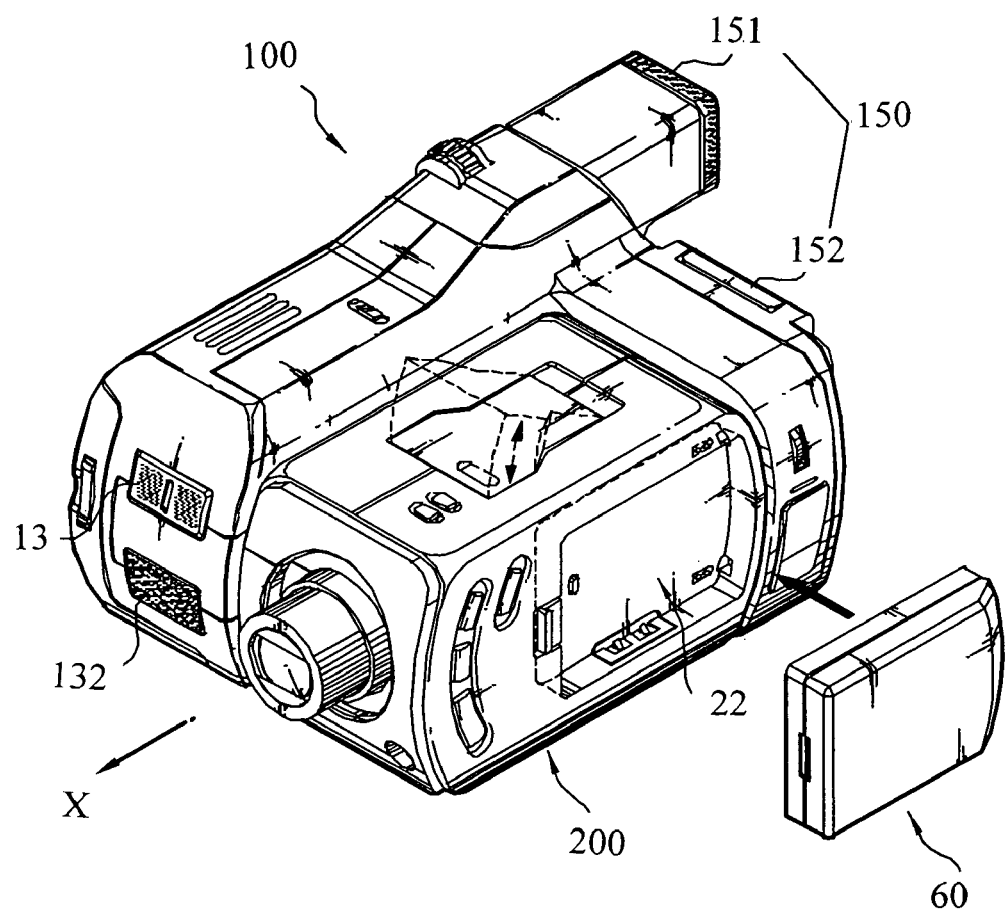
FIG. 1 is a perspective view illustrating a combination image-capturing apparatus according to an embodiment of the present invention.

Several embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein have been omitted for conciseness.

Figure 2:
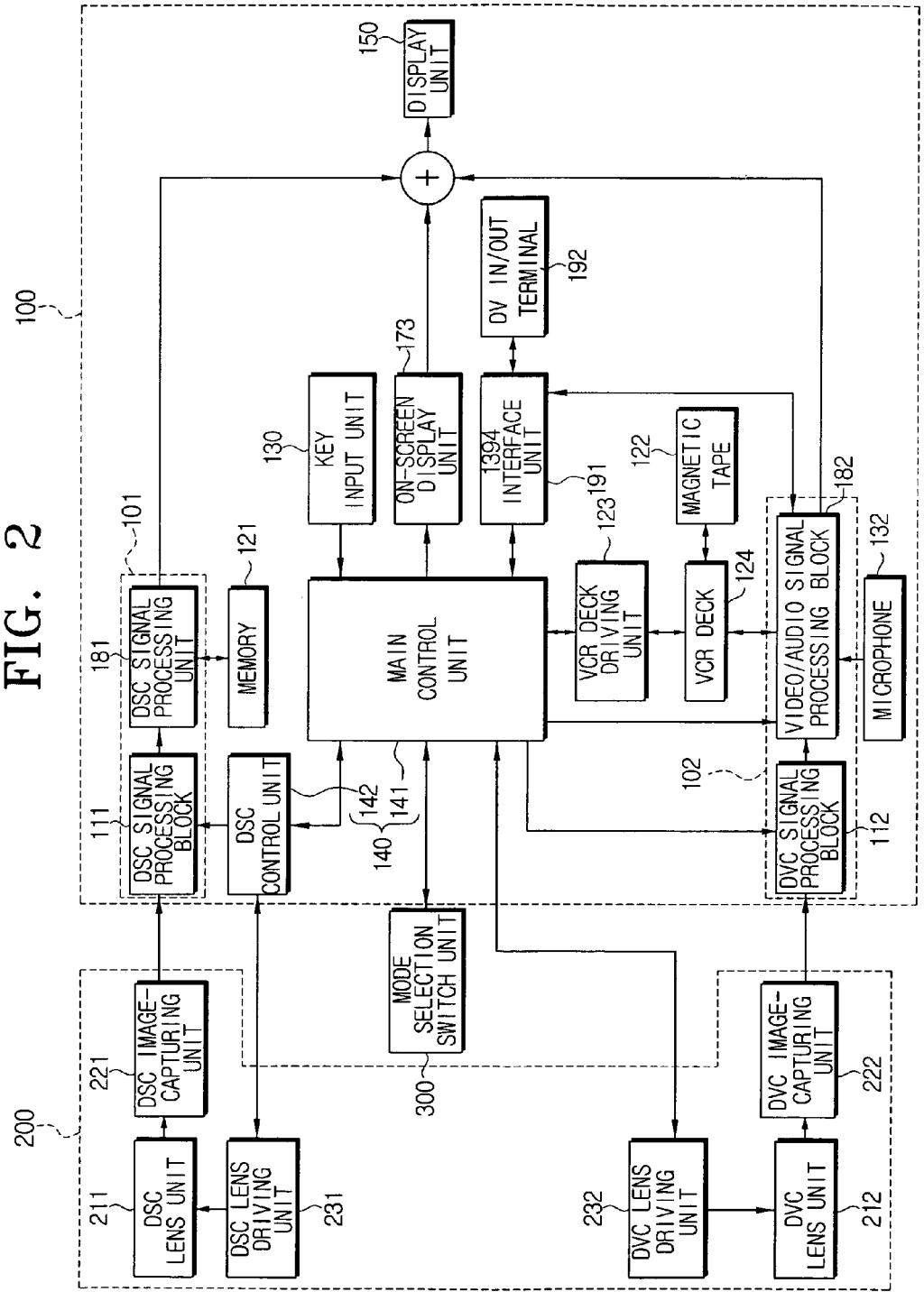
FIG. 2 is a block diagram illustrating a combination image-capturing apparatus of FIG. 1.

FIG. 1 is a perspective view illustrating a combination image-capturing apparatus according to an embodiment of the present invention, and FIG. 2 is a block diagram illustrating the combination image-capturing apparatus of FIG. 1. Referring to FIGS. 1 and 2, the combination image-capturing apparatus, referred to as "DuoCam", is provided with a main body 100, a combination image-capturing unit 200 coupled to the main body 100, and a mode selection switch unit 300.

Referring to FIG. 2, the combination image-capturing unit 200 comprises a digital still camera (DSC) lens unit 211, a DSC image-capturing unit 221, a DSC lens driving unit 231, a digital video camcorder (DVC) lens unit 212, a DVC image-capturing unit 222, and a DVC lens driving unit 232. The DSC lens unit 211 and DSC image-capturing unit 221 are driven independently from the DVC lens unit 212 and DVC image-capturing unit 222 since the kinds of images to be captured may be different. A battery cavity 22 (see FIG. 1) is also provided on the combination image-capturing unit 200 in order for a battery 60 to be detachably mounted.

Referring to FIG. 2, the DSC lens driving unit 231 drives the DSC lens unit 211 based on the controls provided by DSC control unit 142. An optical image focused through the DSC lens unit 211 is photoelectrically converted into an electric signal in the DSC image-capturing unit 221, and the converted signal is sent to the DSC signal processing block 111. The DSC image-capturing unit 221 reads out data in a progressive scanning mode since progressive scanning is the method suitable generally preferred in processing still-image data. Of course, it should be understood other methods can also be used. Progressive scanning is a method that captures one frame at a time rather than dividing the frame into fields, so that very delicate still images can be obtained when the images are captured by a camera using progressive scanning.

The DVC lens driving unit 232 drives the DVC lens unit 212 based on the controls provided by main control unit 141. An optical image focused through the DVC lens unit 212 is photoelectrically converted into an electric signal in the DVC image-capturing unit 222, and the converted signal is sent to the DVC signal processing block 112. The DVC image-capturing unit 222 reads out charges accumulated in each cell based on an interlace scanning method. Interlace scanning is a method that alternately reads odd and even fields of one frame as image information every 1/60 seconds. Interlace scanning is a method used for capturing moving pictures that is generally used. If, however, a fast moving object is attempted to be captured in the DVC image-capturing unit 222, it can be seen that the moving object appears with fine lines that cross the image horizontally. These horizontal cross lines result from a phase difference due to the movement of the object during the time period of 16.67 milli-seconds. In this case, it is possible to remove the horizontal lines by using filters.

FIG. 3A to FIG. 3E are views illustrating operation of the combination image-capturing unit. The combination image-capturing unit 200 is installed to rotate more than at least 180° about a Z axis on one side of the main body 100 by the user's manipulations. Based on the rotation angle of the combination image-capturing unit 200 with respect to the main body 100, image-capturing is performed by either the DSC image-capturing unit 221 or the DVC image-capturing unit 222 that are provided in the combination image-capturing unit 200. Further, image-capturing is performed by an image-capturing unit positioned in a range R of 45 degrees upwards and downwards about the left side of an X axis.

Figure 3A:
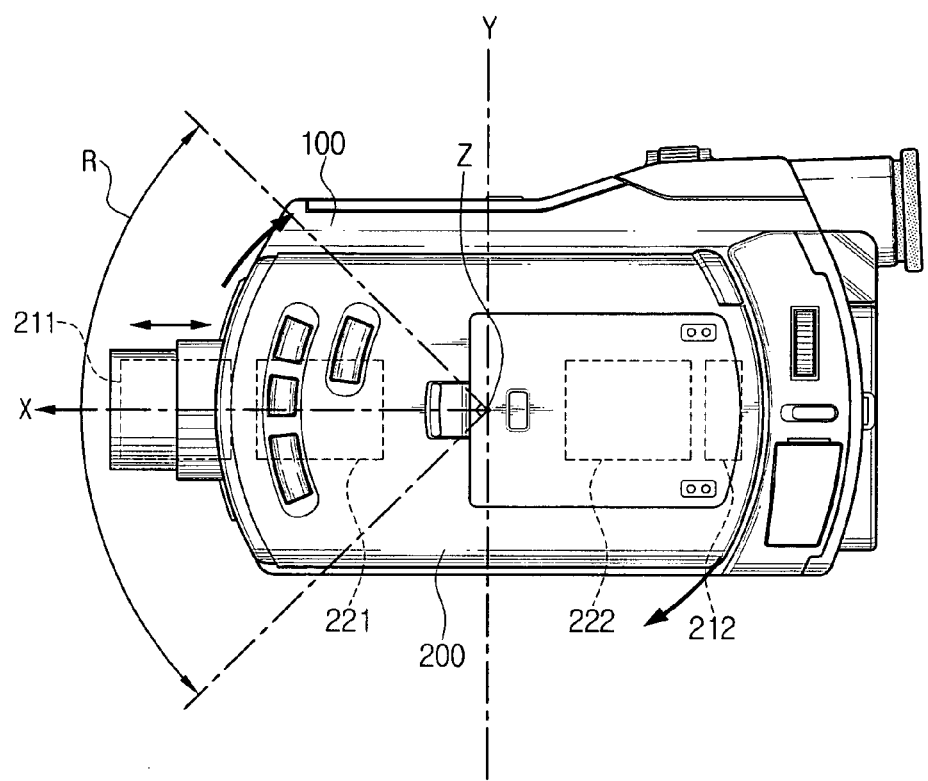
FIG. 3A to FIG. 3E are views illustrating a combination image-capturing unit according to an embodiment of the present invention.

FIG. 3A to FIG. 3E illustrate the positions of the combination image-capturing unit 200 when a user rotates the combination image-capturing unit 200 in 45 degree steps in the clockwise direction, respectively. Note that in these figures, the combination image-capturing unit 200 rotates 180° from its initial position as shown in FIG. 3A. In FIG. 3A, the combination image-capturing unit 200 is at its initial position; in FIG. 3B the combination image-capturing unit 200 has rotated 45° clockwise; in FIG. 3C the combination image-capturing unit 200 has rotated another 45° clockwise (90° total); in FIG. 3D the combination image-capturing unit 200 has rotated an additional 45° (135° total); and in FIG. 3E, the combination image-capturing unit 200 has made a 180° rotation.

Figure 3B:
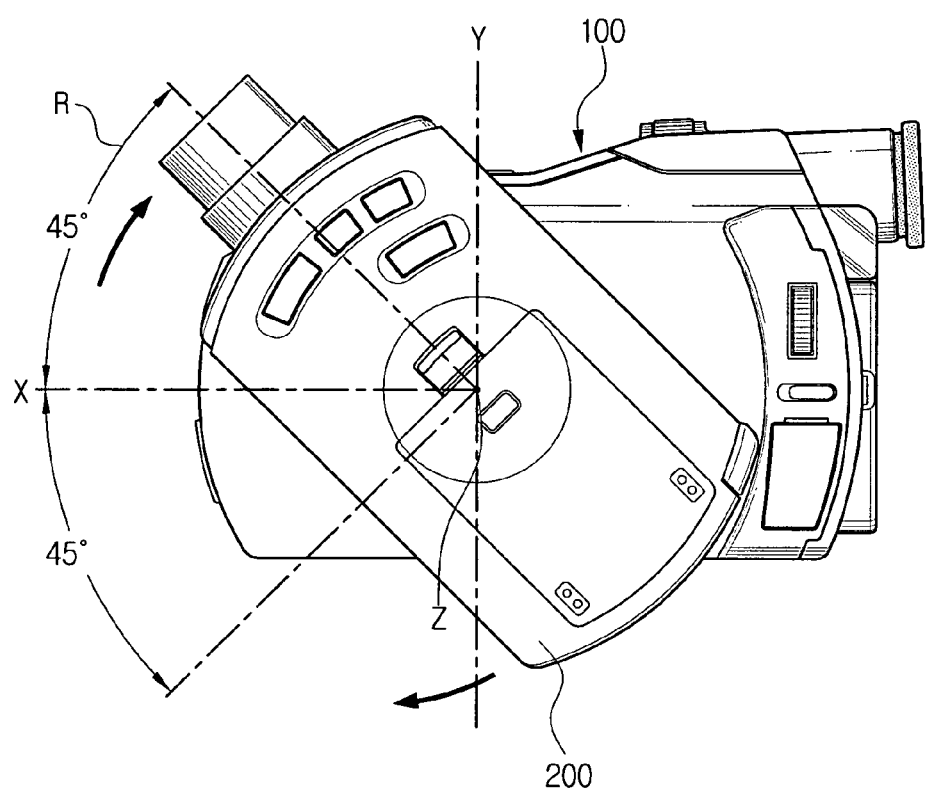
Figure 3C:
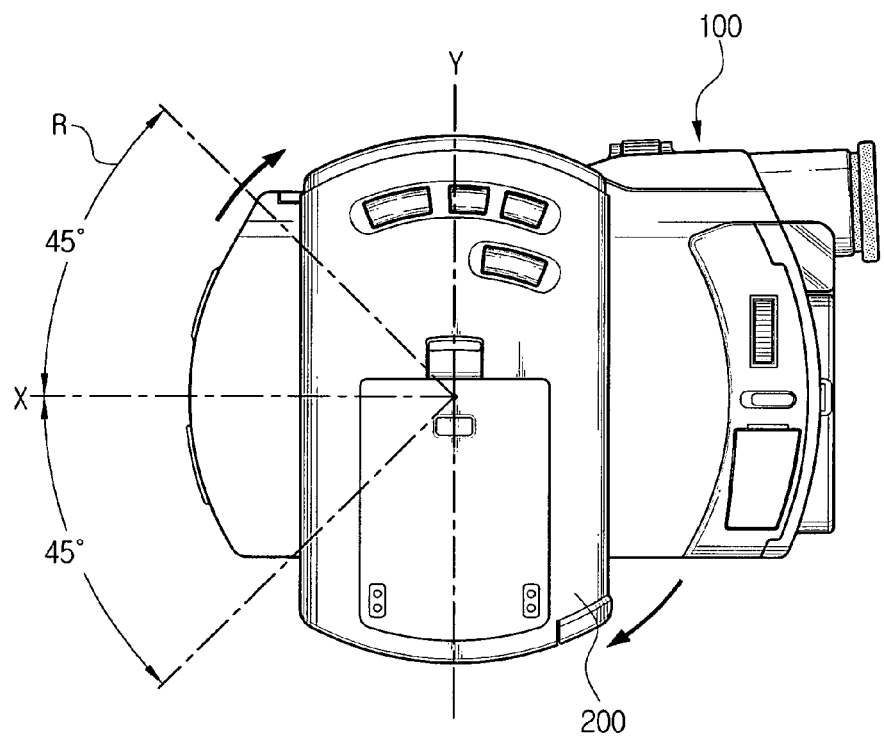

Referring to FIGS. 3A and 3B, dotted lines denote the DSC lens unit 211, DSC image-capturing unit 221, DVC lens unit 212, and DVC image-capturing unit 222. The DSC lens unit 211 and the DSC image-capturing unit 221 are located in the range of 45 degrees upwards and downwards about the left side of the X axis, so that a DSC operation mode is activated in order for the DSC image-capturing unit 211 to capture images. Referring to FIG. 3C, the DSC lens unit 211 and the DSC image-capturing unit 221 are now located in the range of about 45 degrees to the left and right of the upper side of the Y axis, and, in this case, the DVC lens unit 212 and the DVC image-capturing unit 222 (not shown in FIG. 3C), which are symmetrically opposite to the DSC lens unit 211 and the DSC image-capturing unit 221 in the combination image-capturing unit 200, are located in the range of about 45 degrees to the left and right about the lower side of the Y axis. Accordingly, in this configuration, neither of the image-capturing units captures images since neither of the lens units and image-capturing units are located in the range R of 45 degrees upwards and downwards with respect to the left side of the X axis.

Figure 3D:
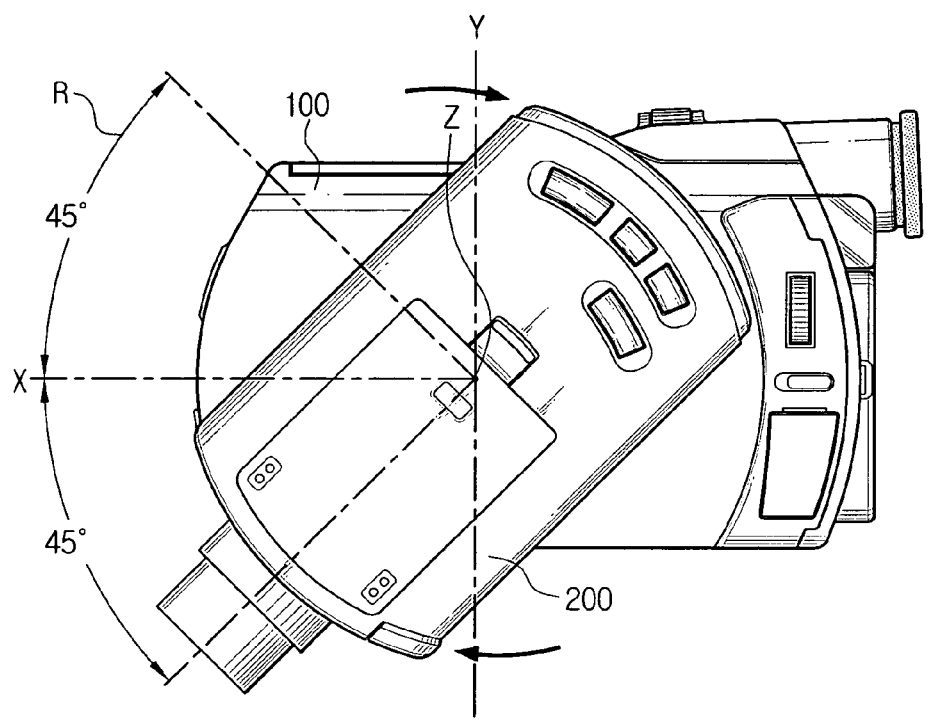
Figure 3E:
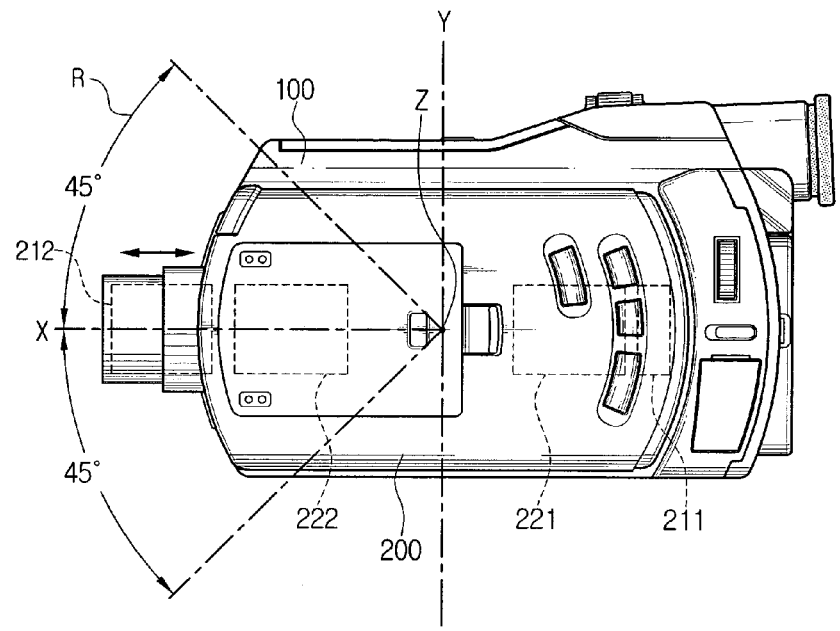

Referring to FIG. 3D and FIG. 3E, the DSC lens unit 211 and the DSC image-capturing unit 221 are located in the range of about 45 degrees upwards and downwards about the right side of the X axis, and, in this configuration, the DVC lens unit 212 and DVC image-capturing unit 222 are located in the range R of about 45 degrees upwards and downwards about the left side of the X axis. Accordingly, capturing images is performed by the DVC image-capturing unit 222 located in the range R of about 45 degrees upwards and downwards about the left side of the X axis.

Figure 4:
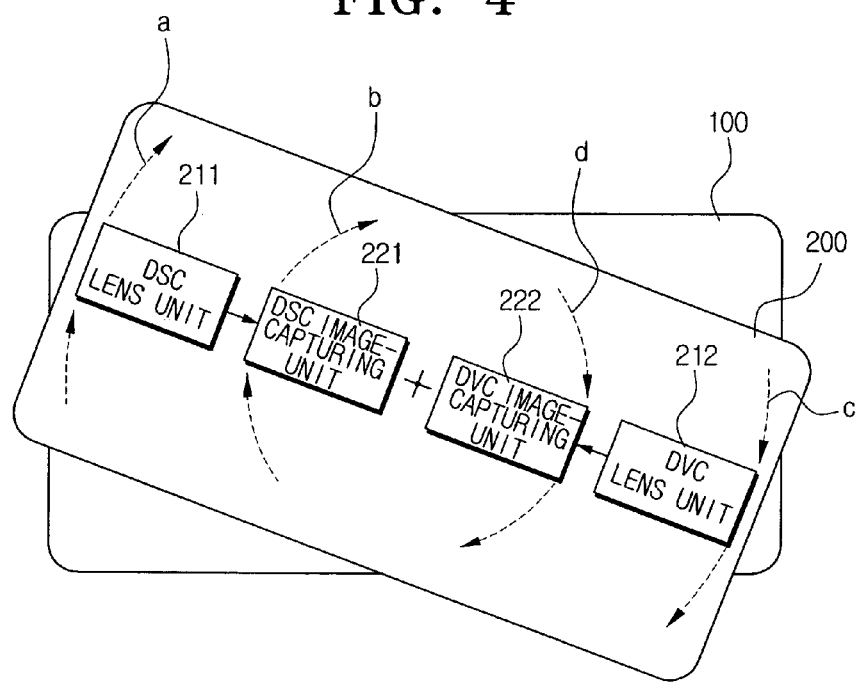
FIG. 4 is a view illustrating rotations of internal units according to rotations of the combination image-capturing unit according to an embodiment of the present invention.

FIG. 4 is a view illustrating the rotation of internal units according to the rotations of the combination image-capturing unit 200. Referring to FIG. 4, the DSC lens unit 211 built in the combination image-capturing apparatus rotates along a first concentric circle a as the combination image-capturing unit 200 rotates with respect to the main body 100, and the DSC image-capturing unit 221 rotates along a second concentric circle b as the DSC lens unit 211 rotates along the first concentric circle a since the DSC image-capturing unit 221 is located on the same line as the DSC lens unit 211. The DVC lens unit 212, which is located opposite to the DSC lens unit 211, rotates along a third concentric circle c as the DSC lens unit 211 rotates along the first concentric circle a, and the DVC image-capturing unit 222 rotates along a fourth concentric circle d as the DVC lens unit 212 rotates along the third concentric circle c since the DVC image-capturing unit 222 is located on the same line as the DVC lens unit 212.

Referring to FIG. 1 and FIG. 2, the main body 100 denotes a main body of the combination image-capturing apparatus. The other units, except for the units provided in the combination image-capturing 200 and the mode selection switch unit 300 can be also built in or provided in the main body. FIG. 2 illustrates a DSC signal processing unit 101, a DVC signal processing unit 102, a memory 121, a magnetic tape 122, a key input unit 130, a control unit 140, a display unit 150, and the like, that are built in or provided in the main body 100. These units are not necessarily provided in the main body 100, but can be separately installed outside the main body 100. In those cases, the memory 121, the magnetic tape 122, the key input unit 130, and the like may be external units.

The DSC signal processing unit 101 consists of the DSC signal processing block 111 and a DSC signal processing unit 181. The DSC signal processing block 111 converts an analog image signal received from the DSC image-capturing unit 221 into a digital image signal while processing the analog image signal in a frame unit. The DSC signal processing block 111 can change color, saturation, and brightness settings, as well as the shutter speed when capturing images, among other settings, based on the controls of the DSC control unit 142. The DSC signal processing unit 181 compresses the digital image data received from the DSC signal processing block 111 into data in the JPEG format. The JPEG-formatted data is stored in the memory 121.

The memory 121 can be a built-in memory that is installed in the main body 100 or a detachable IC memory card. An IC memory card is a recording medium shaped as a card, contains one or more semiconductor memories in a package, has an interface connector at one end thereof, and is used to expand storage capacity (usually of a personal computer, but also for other types of devices that rely on or use digital data). The IC memory cards used for the combination image-capturing apparatus 100 are classified according to the kinds of memories contained therein, and, as a result, there are RAM cards, flash memory cards, among others, for the IC memory cards.

The DVC signal processing unit 102 is comprised of a DVC signal processing block 112 and a video/audio signal processing block 182. The DVC signal processing block 112 converts an analog video signal received from the DVC image-capturing unit 222 into a digital video signal while processing the analog video signal on a per-field unit. The DVC signal processing block 112 can change color, saturation, brightness, and shutter speed when capturing images, among other variables, based on the controls of the main control unit 141. The video/audio signal processing block 182 compresses the digital video signal received from the DVC signal processing block 112 into data in the DV format since the DV format is a scheme suitable for compressing moving picture data. The DV-formatted signal is stored in the magnetic tape 122 through a VCR deck 124. Of course, other digital video formats can be used, including MPEG4, among others.

The key input unit 130 is provided with a switch (not shown), for capturing images. The key input unit 130 is a photo-switch that sends to the main control unit 141 a photo trigger signal to cause the JPEG-formatted signal to be stored in the memory 121, or to store the DV-formatted signal on the magnetic tape 122. If a user selects an image to be captured and presses the photo-switch provided on the key input unit 130, a compressed digital signal of the image is stored in the recording medium.

An on-screen display unit 173 receives a control signal from the main control unit 141, and generates specific characters at a specific location of the display unit 150. Further, a captured image is combined with the characters generated from the on-screen display unit 173, and sent to the display unit 150 for display, so that a user can view the captured image through the display.

A, IEEE 1394 interface unit 191 is used to communicate data with other external devices, but is mainly used to interface with personal computers (PCs). Through use of the IEEE 1394 interface unit 191, captured digital video data can be sent to a PC or, inversely, received from the PC for recording in the magnetic tape 122.

The control unit 140 is constructed with the main control unit 141 and the DSC control unit 142. If a photo trigger signal is received from the photo-switch provided on the key input unit 130, the main control unit 141 decides which operation mode, of either the DSC operation mode or the DVC operation mode, is the current operation mode, based on an operation mode signal received from the mode selection switch unit 300. If the operation mode signal indicates the DSC operation mode, the main control unit 141 controls the DSC control unit 142 to control the DSC lens driving unit 231 and the DSC signal processing block 111. Thereafter, an optical image focused through the DSC lens unit 211 is photoelectrically converted into an electric signal in the DSC image-capturing unit 221. The converted signal is compressed as JPEG-formatted data in the video signal processing block 181 via a signal processing step in the DSC signal processing block 111 and finally stored in the memory 121. Alternatively, If the operation mode signal indicates the DVC operation mode, the main control unit 141 controls the DVC lens driving unit 232, the DVC signal processing block 112, the video/audio signal processing block 182, and the VCR deck driving unit 123 to capture a video image. Thereafter, an optical image that is focused through the DVC lens unit 212 is photoelectrically converted into an electric signal in the DVC image-capturing unit 222. The converted signal is compressed into DV-formatted data in the video/audio signal processing block 182 via a signal processing step in the DSC signal processing block 112, and finally stored in the magnetic tape 122 through the VCR deck 124. Accordingly, a user does not have to separately set a recording medium to store a video signal from the DSC and DVC image-capturing units 221 and 222 since the combination image-capturing apparatus automatically sets, according to the current operation mode thereof, the recording medium in which a compressed video signal is stored.

Referring to FIG. 1, the display unit 150 is provided on the main body 100, and has a viewfinder 151 for displaying captured images and an LCD panel 152 provided on the main body 100. In FIG. 2, the display unit 150 receives and displays information on a selected operation mode from the on-screen display unit 173 operating according to the controls of the main control unit 141, and displays images received from the video signal processing block 181 and the video/audio signal processing block 182.

As shown in FIG. 1, a speaker 13 is provided for outputting reproduced sounds, and a microphone 132 is provided for capturing external sounds on the part of the main body facing in the image-capturing direction X.

The mode selection switch unit 300 (FIG. 2) is installed to interact with the combination image-capturing unit 200, and outputs an operation mode signal to the main control unit 141 in accordance with changes in the position of the combination image-capturing unit 200. In an embodiment of the present invention, the combination image-capturing unit 200 is rotatably installed with respect to the main body 100, so that the mode selection switch unit 300 outputs an operation mode signal that corresponds with the rotation angle of the combination image-capturing unit 200. The main control unit 141 receives the operation mode signal and decides upon the current mode of operation.

As shown in FIG. 3A, if the DSC lens unit 211 and the DSC image-capturing unit 221 are located in the range of about 45 degrees upwards and downwards about the left side of the X axis, the mode selection switch unit 300 outputs a DSC operation mode signal to the main control unit 141, and the control unit 140 activates the DSC image-capturing unit 221 and deactivates the DVC image-capturing unit 222. As shown in FIG. 3e, however, if the DVC lens unit 212 and the DVC image-capturing unit 222 are located in the range of about 45 degrees upwards and downwards about the left side of the X axis, the mode selection switch unit 300 outputs a DVC operation mode to the main control unit 141, and the control unit 140 activates the DVC image-capturing unit 222 and deactivates the DSC image-capturing unit 221.

Figure 5:
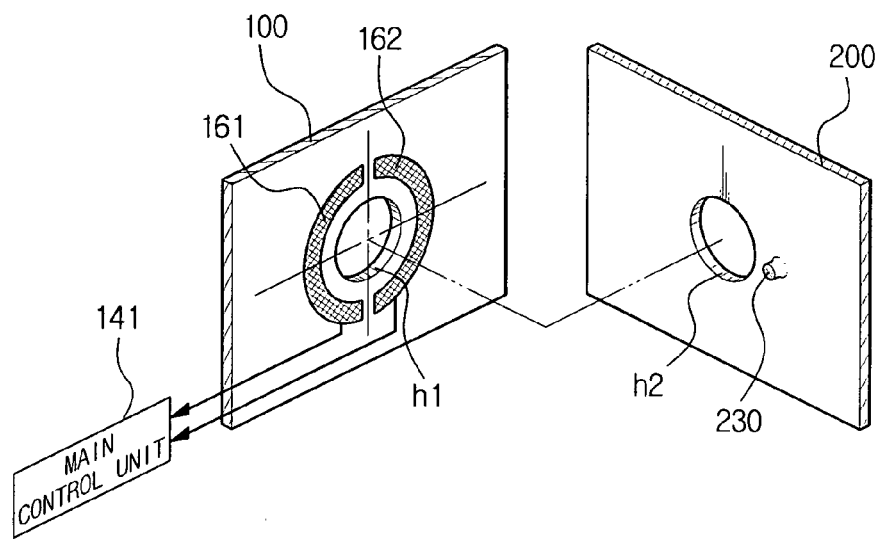
FIG. 5 to FIG. 9 are views illustrating a mode selection switch unit according to an embodiment of the present invention.

FIGS. 5 to 8 are views illustrating operation of the mode selection switch unit. FIG. 5 is a perspective view illustrating operation of the mode selection switch unit 300 of FIG. 2. Referring to FIG. 5, the switch unit can be structured to include first and second contact patterns 161 and 162 provided on the main body 100, and a contact terminal 230 provided on the combination image-capturing unit 200 to be in contact with either of the contact patterns 161 and 162. In accordance with the structure described above, the main body 100 and the combination image-capturing unit 200 are coupled with each other opposite to the holes h1 and h2 and to be relatively rotatable with each other. Accordingly, the contact terminal 230 comes in contact with the first contact pattern 161 or the second contact pattern 162 according to the rotation angle of the combination image-capturing unit 200 with respect to the main body 100. The first contact pattern 161 is connected to a first port of the main control unit 141, and the second contact pattern 162 is connected to the second port of the main control unit 141.

Figure 6:
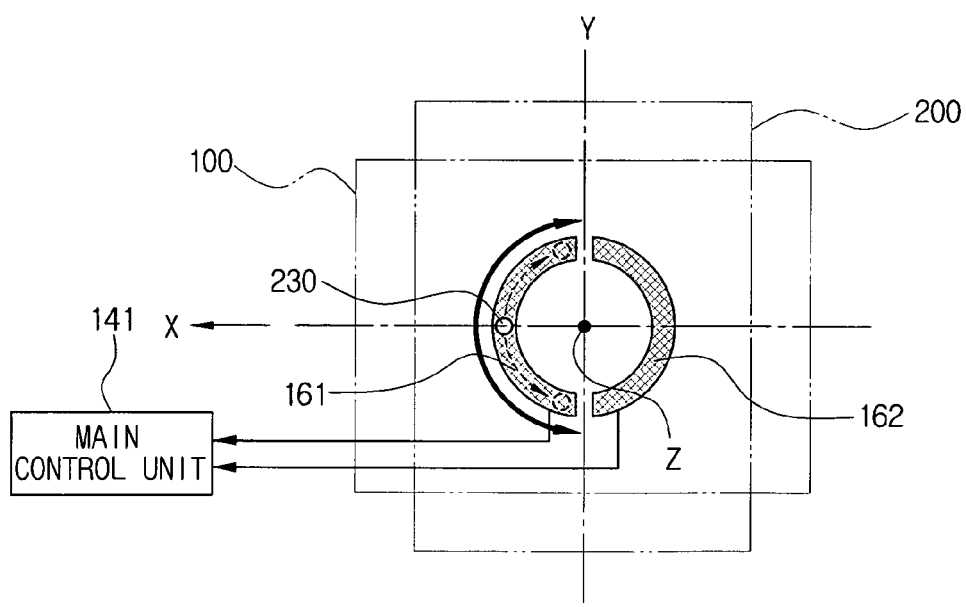

FIG. 6 is a view illustrating a situation in which the DSC image-capturing unit 221 is selected by the switch unit of FIG. 5. In this case, as shown in FIG. 6, if the contact terminal 230 comes in contact with the first contact pattern 161 and a rotation angle of the combination image-capturing unit 200 is in the first range (in which the contact terminal 230 is in a range of about 90 degrees upwards and downwards about the left side of the X axis), a binary signal of "1", which is the DSC operation mode signal for activating the DSC image-capturing unit 221, is output to the first port of the main control unit 141, and a binary signal of "0" is output to the second port of the main control unit 141. Accordingly, the DSC operation mode is selected in order for the DSC image-capturing unit 221 to capture images, so that the control unit 140 activates the DSC image-capturing unit 221 and deactivates the DVC image-capturing unit 222.

If, however, the contact terminal 230 comes in contact with the second contact pattern 162 and the rotation angle of the combination image-capturing unit 200 is in the second range (in which the contact terminal 230 is in the range of about 90 degrees upwards and downwards about the right side of the A axis), the binary signal of "1", which is the DVC operation mode signal for activating the DVC image-capturing unit 222, is output to the second port of the main control unit 141, and the binary signal of "0" is output to the first port of the main control unit 141.

The first and second contact patterns 161 and 162 are provided to be in contact with the contact terminal 230 at about 180°. Accordingly, either the DSC or DVC image-capturing units 221 and 222 will be activated. Activation of either the DSC or DVC image-capturing units 221 or 222 occurs at all rotation angles of the combination image-capturing unit 200 with respect to the main body 100. Preferably, as illustrated in FIG. 6, the image-capturing unit is located on the left about the Y axis, and the image-capturing unit can be activated in the range of all the rotation angles to be formed in the location. Therefore, the DSC and DVC image-capturing units 221 and 222 are activated or deactivated by the switch unit with reference to the Y axis.

Figure 7:
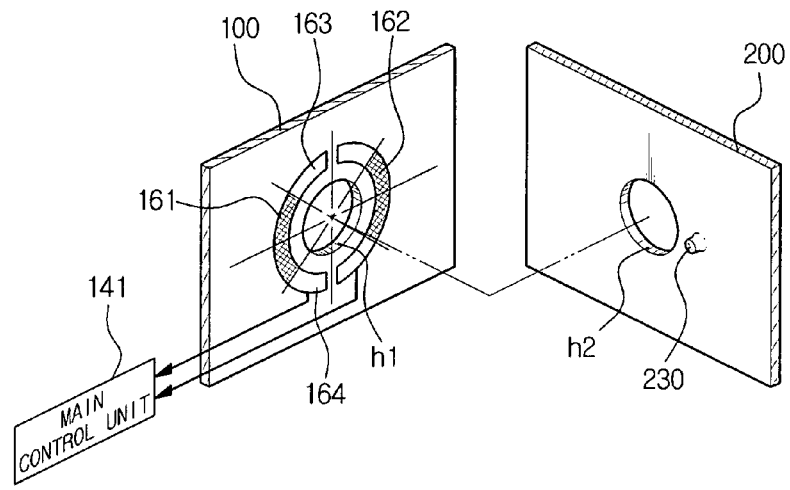

FIG. 7 is a perspective view illustrating operation of the mode selection switch unit 300 of FIG. 1 in accordance with another embodiment of the present invention. The switch unit shown in FIG. 7 includes third and fourth contact patterns 163 and 164 in addition to the first and second contact patterns 161 and 162 provided on the main body 100, and can be structured to include the contact terminal 230 provided on the combination image-capturing unit 200, to thereby come in contact with any of the contact patterns 161 to 164. Therefore, the contact terminal 230 comes in contact with any of the first to fourth contact patterns 161 to 164 according to the rotation angle of the combination image-capturing unit 200 with respect to the main body 100. The first contact pattern 161 is connected to the first port of the main control unit 141, and the second contact pattern 162 is connected to the second port of the main control unit 141, and the third and fourth contact patterns 163 and 164 are not connected to the ports of the main control unit 141.

Figure 8:
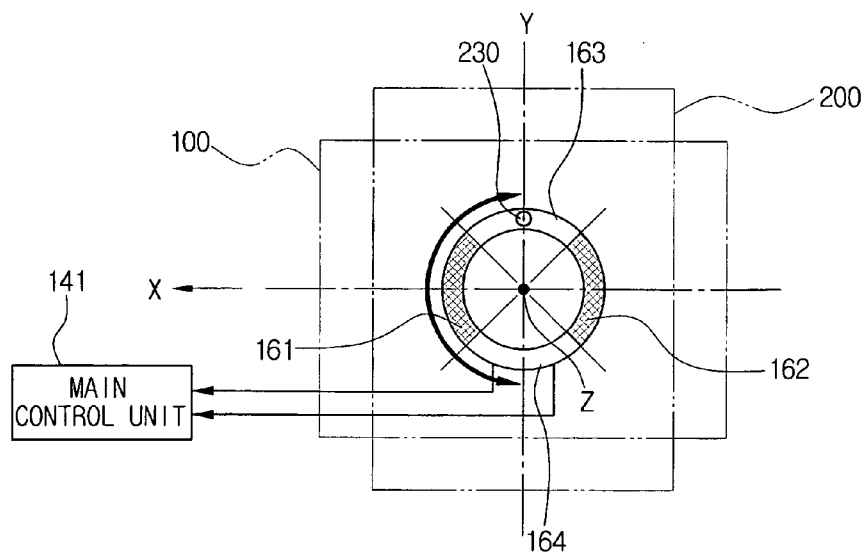

FIG. 8 is a view illustrating a situation in which neither of the image-capturing units are selected by the switch unit of FIG. 7. If the rotation angle of the combination image-capturing unit 200 is in a third range (in which the contact terminal 230 is in the range of 45 degrees in the left and right about the upper side of the Y axis), such that the contact terminal 230 comes in contact with the third contact pattern 163, the operation mode signal is not output to the ports of the main control unit 141. Similarly, the operation mode signal is not output in the case that the contact terminal 230 comes in contact with the fourth contact pattern 164. If the operation mode signal is not received, the control unit 140 deactivates the active image-capturing unit, so that all the DSC and DVC image-capturing units 221 and 222 are deactivated.

If the first to fourth contact patterns 161 to 164 are provided in an interval of 90 degrees, the DSC image-capturing unit 221 is activated when the contact terminal 230 is located in the range of about 45 degrees upwards and downwards about the left side of the X axis, and the DVC image-capturing unit 222 is activated when the contact terminal 230 is located in the range of about 45 degrees upwards and downwards about the right side of the X axis, and neither image-capturing unit is activated when the contact terminal 230 is located in the range of about 45 degrees to the left and right about the upper side of the Y axis or about the lower side of the Y axis. The purpose of these zones of non-operation for either image-capturing unit is to prevent the lens units 221 and 222 from colliding with the main body 100 when the image-capturing units are in the range of 45 degrees to the left and right of the Y axis. This could occur if a user rotated the combination image-capturing unit 200 such that the DSC and DVC lens units 211 and 212 are externally extended out of the combination image-capturing unit 200 with the zoom-in function set.

Figure 9:
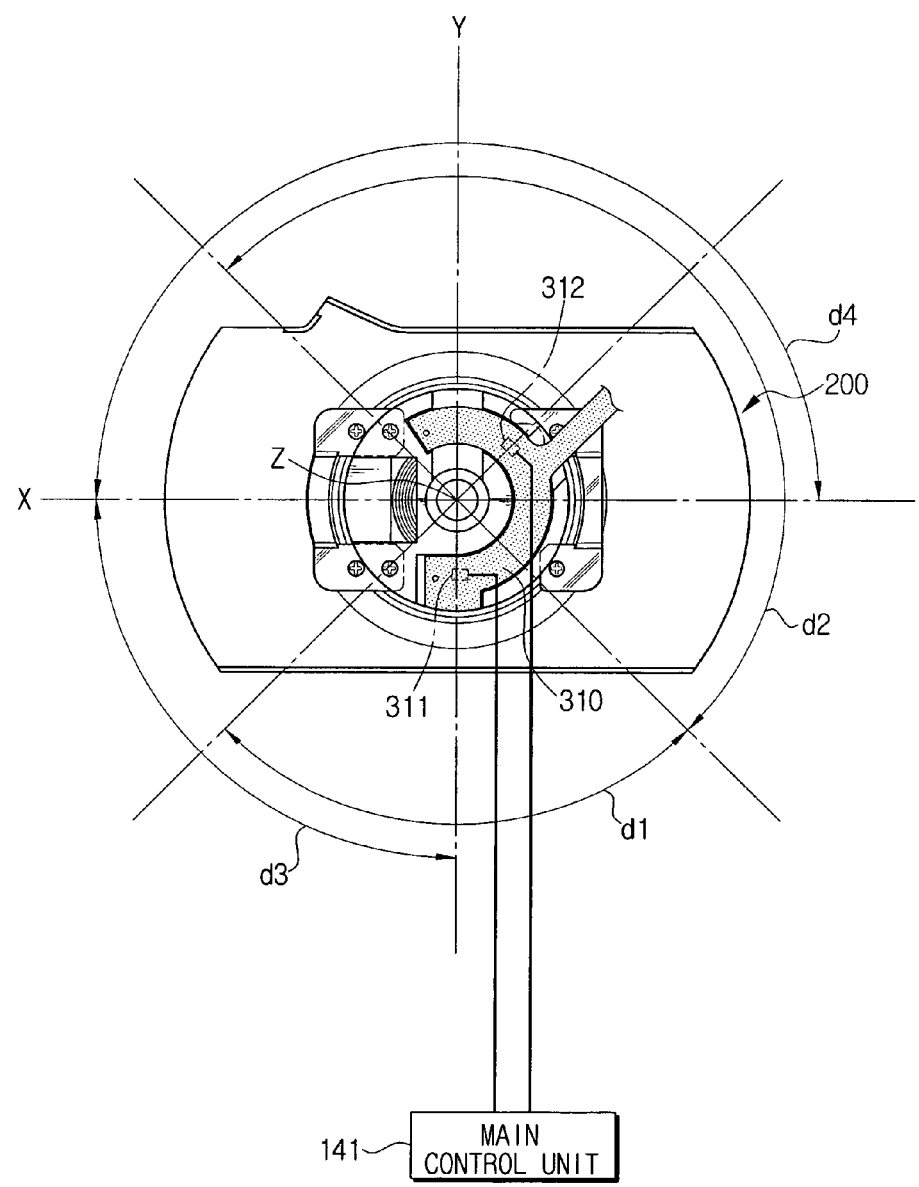

FIG. 9 is a view illustrating a switch unit as another example of the mode selection switch unit 300 of FIG. 2. Referring to FIG. 9, a mode switch unit 310 is provided on the side on which the combination image-capturing unit 200 comes in contact with the main body 100, and the DSC mode switch unit 311 and DVC mode switch unit 312 are provided on the mode switch unit 310. The DSC mode switch unit 311 is connected to the first port of the main control unit 141, and the DVC mode switch unit 312 is connected to the second port of the main control unit 141. If the combination image-capturing unit 200 rotates with respect to the main body, the mode switch unit 310, DSC mode switch unit 311, and DVC mode switch unit 312 are also rotated together with the combination image-capturing unit 200.

The DSC mode switch unit 311 can rotate in a range from d1 to d2 of FIG. 9. If the DSC mode switch unit 311 is located in the range of d1, that is, in a range of about 45 degrees to the left and right about the lower side of the Y axis, the binary signal of "1" is output to the first port of the main control unit 141, wherein the binary signal of "1" is the DSC operation mode signal for activating the DSC image-capturing unit 221, and the binary signal of "0" is output to the second port of the main control unit 141. The DVC mode switch unit 312 can also rotate in the range from d3 to d4. If the DVC mode switch unit 312 is located in the range of d3 of FIG. 9 (in a range of about 90 degrees to the left of the lower side of the Y axis), the binary signal of "1" is output to the second port of the main control unit 141, wherein the binary signal of "1" is the DVC operation mode signal for activating the DVC image-capturing unit 222, and the binary signal of "0" is output to the first port of the main control unit 141.

Figure 10:
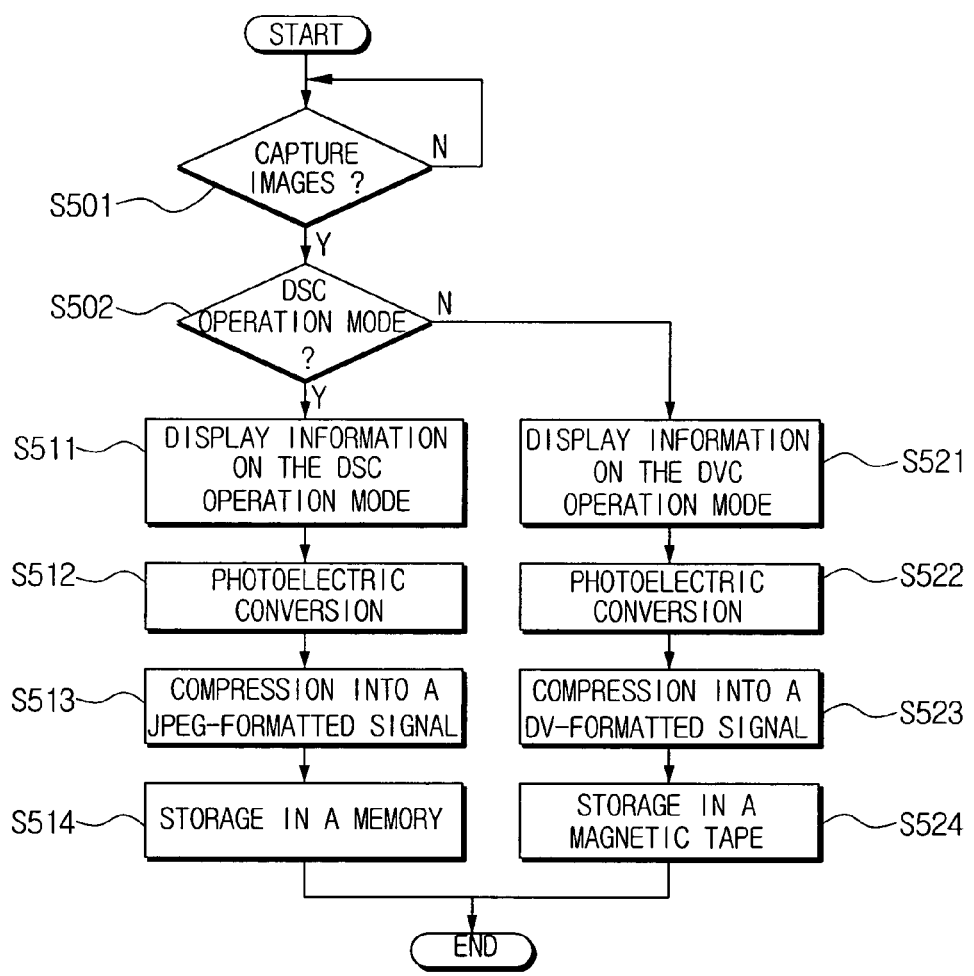
FIG. 10 is a flow chart illustrating a combination image-capturing method according to an embodiment of the present invention.

FIG. 10 is a flow chart illustrating a method of operation a for the combination image-capturing according to an embodiment of the present invention. Referring to FIG. 10, the main control unit 141 first detects whether a photo trigger command exists instructing the capturing and storing of images (decision step S501). If the photo trigger command is detected in decision step S501 ("Yes" path from decision step S501), the main control unit 141 determines the operation mode based on the operation mode signal received from the mode selection switch unit 300 (decision step S502).

If it is decided that the DSC operation mode is the selected mode in decision step S502, the display unit 150 notifies the user, on the display 150, that the combination image-capturing apparatus is currently operating in the DSC operation mode together with information on the DSC operation mode (S511). The DSC image-capturing unit 221 then photoelectrically converts an optical image focused through the DSC lens unit 211 into an electric signal, and sends the electric signal to the DSC signal processing unit 101 (S512). The DSC signal processing unit 101 compresses the electric signal into a JPEG-formatted signal (S513). The JPEG-formatted signal is stored in the memory 121 (S514).

If is decided, however, that the operating mode is the DVC operation mode in decision step S502 ("no" path from decision step S502), the display unit 150 notifies the user, on the display 150, that the combination image-capturing apparatus is currently operating in the DVC operation mode together with information on the DVC operation mode (S521). The DVC image-capturing unit 222 then photoelectrically converts an optical image focused through the DVC lens unit 212 into an electric signal, and sends the electric signal to the DVC signal processing unit 102 (S522). The DVC signal processing unit 102 compresses the electric signal into a DV-formatted signal (S523). The DV-formatted signal is then stored on the magnetic tape 122 through the VCR deck 124 (S524).

As described above, the embodiments of the present invention enables one photo switch to store images in first and second recording media corresponding to the first and second image-capturing units independently driven to capture the images. This eliminates the inconvenience of using separate photo switches with the current operating mode checked as the user captures the images with the combination image-capturing apparatus. Therefore, the size of the image-capturing apparatus is reduced and less photo-switches are used. The combination image-capturing apparatus built in accordance with the embodiments of the present invention can be built smaller, in line with the current trends of minimization of portable products.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

The invention claimed is:

1. A method for operating a combination image capturing apparatus, the combination image capturing apparatus having a combination image-capturing unit (CICU) and a main body, the method comprising:

determining whether a photo trigger command exists for instructing the capturing and storing of images by the combination image capturing apparatus;

determining the operating mode of the combination image capturing apparatus if the photo trigger command exists, and if the photo trigger command does not exist, continuing to determine whether the photo trigger command exists; and storing digital still camera image information in a first memory if the operating mode corresponds to a digital still camera operating mode, otherwise, storing digital video camera image information in a second memory;

wherein in determining the operating mode, the digital still camera operating mode or the digital video camera operating mode is determined based on a rotational angle of the CICU with respect to the main body.

2. The method according to claim 1, wherein the step of determining whether a photo trigger command exists comprises:

monitoring a key input unit by a main control unit to determine if a user has selected an image to be captured.

3. The method according to claim 1, wherein the step of determining the operating mode of the combination image capturing apparatus comprises:

rotating the combined image-capturing unit comprising a digital still camera and a digital video camera to a first or second region of operation;

generating an operating mode signal based on a position of the rotated combined image-capturing unit; and determining the operating mode of the combination image capturing apparatus based on the operating mode signal.

4. The method according to claim 3, wherein the step of generating an operating mode signal comprises:
generating a first set of signals if the DSC is operating; and
generating a second set of signals if the DVC is operating; and
determining the operating mode of the combination image capturing apparatus based on the first and second set of signals.

5. The method according to claim 3, wherein the first region corresponds to a DSC and the second region corresponds to the DVC.

6. The method according to claim 3, further comprising:
rotating the combined image-capturing unit comprising a digital still camera and a digital video camera to a third or fourth region of operation.

7. The method according to claim 3, wherein the step of rotating the combined image-capturing unit comprised of a digital still camera and a digital video camera to the first or second region of operation comprises:
rotating both a DSC and DVC mode switch units on a mode switch unit to either a first or second region wherein a first set of signals is generated if rotated to the first region and a second set of signals is generated if rotated to the second region.

8. The method according to claim 3, wherein the step of generating an operating mode signal comprises:
generating a DSC signal corresponding to a DSC mode if the camera is in the first region of operation; and
generating a DVC signal corresponding to a DVC mode if the camera is in the second region of operation.

9. The method according to claim 8, wherein the step of generating a DSC signal comprises:
generating a first binary signal value of one and generating a second binary signal value of zero.

10. The method according to claim 8, wherein the step of generating a DVC signal comprises:
generating a first binary signal value of zero and generating a second binary signal value of one.

11. The method according to claim 1, wherein the step of storing digital still camera information in the memory if the operating mode corresponds to the digital still camera operating mode comprises:
notifying the user that the combination image-capturing apparatus is currently operating in the DSC operation mode;
converting photoelectrically an optical image focused through a DSC lens unit into an electric signal, and sending the electric signal to a DSC signal processing unit; and
compressing the electric signal into a JPEG-formatted signal by a DSC signal processing unit; and
storing the JPEG-formatted signal in a memory.

12. The method according to claim 11, wherein the step of notifying the user the combination image-capturing apparatus is currently operating in the DSC operation mode comprises:
displaying the notification of the operation mode of the combination image capturing apparatus to the user on a display, together with information on the DSC operation mode.

13. The method according to claim 1, wherein the step of storing digital video camera information in the second memory if the operating mode corresponds to the digital video camera operating mode comprises:
notifying the user that the combination image-capturing apparatus is currently operating in the DVC operation mode;
converting photoelectrically an optical image focused through a DVC lens unit into an electric signal, and sending the electric signal to a DVC signal processing unit;
compressing the electric signal into a DV-formatted signal by a DVC signal processing unit;
storing the DV-formatted signal on a magnetic tape through a VCR deck, wherein the magnetic tape is the second memory.

14. The method according to claim 13, wherein the step of notifying the user the combination image-capturing apparatus is currently operating in the DVC operation mode comprises:
displaying the notification of the operation mode of the combination image capturing apparatus to the user on a display, together with information on the DVC operation mode.

15. A method for operating a combination image capturing apparatus comprising:
determining whether a photo trigger command exists for instructing the capturing and storing of images by the combination image capturing apparatus;
determining the operating mode of the combination image capturing apparatus if the photo trigger command exists, and if the photo trigger command does not exist, continuing to determine whether the photo trigger command exists; and
storing digital still camera image information in a first memory if the operating mode corresponds to a digital still camera operating mode, otherwise, storing digital video camera image information in a second memory;
wherein the step of determining the operating mode of the combination image capturing apparatus comprises:
rotating a combined image-capturing unit comprising a digital still camera and a digital video camera to a first or second region of operation;
generating an operating mode signal based on a position of the rotated combined image-capturing unit; and
determining the operating mode of the combination image capturing apparatus based on the operating mode signal;
wherein the step of rotating the combined image-capturing unit comprising a digital still camera and a digital video camera to the first or second region of operation comprises:
contacting a contact terminal on the combination image capturing unit to a first contact pattern thereby generating the first set of signals indicating the DSC is operating; and
contacting the contact terminal on the combination image capturing unit to a second contact pattern thereby generating the second set of signals indicating the DVC is operating.

16. The method according to claim 15, wherein:
the first contact pattern extends about the left side of a Y axis of the combination image capturing unit, wherein the Y axis is formed perpendicular to the image capturing direction that is defined as an X axis; and
the second contact pattern extends about the right side of a Y axis of the combination image capturing unit, wherein the Y axis is formed perpendicular to the image capturing direction that is defined as the X axis.

17. A method for operating a combination image capturing apparatus comprising:

determining whether a photo trigger command exists for instructing the capturing and storing of images by the combination image capturing apparatus;

determining the operating mode of the combination image capturing apparatus if the photo trigger command exists, and if the photo trigger command does not exist, continuing to determine whether the photo trigger command exists; and storing digital still camera image information in a first memory if the operating mode corresponds to a digital still camera operating mode, otherwise, storing digital video camera image information in a second memory;

wherein the step of determining the operating mode of the combination image capturing apparatus comprises:

rotating a combined image-capturing unit comprising a digital still camera and a digital video camera to a first or second region of operation;

generating an operating mode signal based on a position of the rotated combined image-capturing unit; and determining the operating mode of the combination image capturing apparatus based on the operating mode signal;

wherein the method further comprises:

rotating the combined image-capturing unit comprising a digital still camera and a digital video camera to a third or fourth region of operation;

wherein the step of rotating the combined image-capturing unit comprised of a digital still camera and a digital video camera to the first, second, third or fourth region of operation comprises:

contacting a contact terminal on the combination image capturing unit to a first contact pattern thereby generating the first set of signals indicating the DSC is operating;

contacting the contact terminal on the combination image capturing unit to a second contact pattern thereby generating the second set of signals indicating the DVC is operating; and contacting the contact terminal on the combination image capturing unit to a third or fourth contact pattern to deactivate the combined image-capturing unit.

18. A method for operating a combination image capturing apparatus comprising:

determining whether a photo trigger command exists for instructing the capturing and storing of images by the combination image capturing apparatus;

determining the operating mode of the combination image capturing apparatus if the photo trigger command exists, and if the photo trigger command does not exist, continuing to determine whether the photo trigger command exists; and storing digital still camera image information in a first memory if the operating mode corresponds to a digital still camera operating mode, otherwise, storing digital video camera image information in a second memory;

wherein the step of determining the operating mode of the combination image capturing apparatus comprises:

rotating a combined image-capturing unit comprising a digital still camera and a digital video camera to a first or second region of operation;

generating an operating mode signal based on a position of the rotated combined image-capturing unit; and determining the operating mode of the combination image capturing apparatus based on the operating mode signal;

wherein the method further comprises:

rotating the combined image-capturing unit comprising a digital still camera and a digital video camera to a third or fourth region of operation;

wherein:

the first contact pattern extends above and below an X axis by about 45 degrees both above and below on the left side of a Y axis of the combination image capturing apparatus, wherein the Y axis is formed perpendicular to the image capturing direction that is defined as the X axis;

the second contact pattern extends above and below an X axis by about 45 degrees both above and below on the right side of the Y axis of the combination image capturing apparatus;

the third contact pattern extends to the left and right of the Y axis above the X axis by about 45 degrees both to the left and the right side of the Y axis; and the fourth contact pattern extends to the left and right of the Y axis below the X axis by about 45 degrees both to the left and the right side of the Y axis.

19. A method for operating a combination image capturing apparatus comprising:

determining whether a photo trigger command exists for instructing the capturing and storing of images by the combination image capturing apparatus;

determining the operating mode of the combination image capturing apparatus if the photo trigger command exists, and if the photo trigger command does not exist, continuing to determine whether the photo trigger command exists; and storing digital still camera image information in a first memory if the operating mode corresponds to a digital still camera operating mode, otherwise, storing digital video camera image information in a second memory;

wherein the step of determining the operating mode of the combination image capturing apparatus comprises:

rotating a combined image-capturing unit comprising a digital still camera and a digital video camera to a first or second region of operation;

generating an operating mode signal based on a position of the rotated combined image-capturing unit; and determining the operating mode of the combination image capturing apparatus based on the operating mode signal;

wherein the step of rotating the combined image-capturing unit comprised of a digital still camera and a digital video camera to the first or second region of operation comprises:

rotating both a DSC and DVC mode switch units on a mode switch unit to either a first or second region wherein a first set of signals is generated if rotated to the first region and a second set of signals is generated if rotated to the second region;

wherein:

the first region of operation extends about the left side a Y axis by about 45 degrees and right side by about 45 degrees of the Y axis of the combination image capturing unit below an X axis, wherein the Y axis is formed perpendicular to the image capturing direction that is defined as the X axis; and the second region of operation extends about the left side by about 90 degrees of the Y axis of the combination image capturing unit below the X axis.

20. A combination image-capturing apparatus comprising:

a main body;

a main control unit;

a key input unit adapted to send to the main control unit a photo trigger signal to cause a video image signal or a still image signal to be stored;

a combination image-capturing unit (CICU), comprised of a digital still camera (DSC) and a digital video camera (DVC); and a mode selection switch unit adapted to determine an operating mode of the CICU based on a rotation angle of the CICU with respect to the main body;

wherein the mode selection switch unit is adapted to generate a first set of signals if the DSC is operating, and generating a second set of signals if the DVC is operating; and wherein the mode selection switch unit comprises:

first and second contact patterns provided on the main body, and a contact terminal provided on the combination image-capturing unit adapted to be in contact with either the first or second contact patterns, wherein the contact terminal is in contact with the first contact pattern when the CICU is operating in a DSC mode and generates the first set of signals, and the contact terminal is in contact with the second contact pattern when the CICU is operating in the DVC mode and generates the second set of signals.

21. The combination image-capturing apparatus according to claim 20, wherein the first set of signals comprises:
a first binary signal value of one generated from the first contact pattern and a second binary signal value of zero generated from the second contact pattern when the CICU is operating in the DSC mode.

22. The combination image-capturing apparatus according to claim 20, wherein the second set of signals comprises:
a first binary signal value of zero generated from the first contact pattern and a second binary signal value of one generated from the second contact pattern when the CICU is operating in the DVC mode.

23. The combination image-capturing apparatus according to claim 20, wherein:
the first contact pattern extends about the left side of a Y axis of the combination image capturing unit, wherein the Y axis is formed perpendicular to the image capturing direction that is defined as the X axis; and
the second contact pattern extends about the right side of a Y axis of the combination image capturing unit, wherein the Y axis is formed perpendicular to the image capturing direction that is defined as the X axis.

24. The apparatus according to claim 20, wherein the mode select switch unit further comprises:
a third and fourth contact pattern provided on the main body, and wherein the contact terminal is in contact with the third or fourth contact pattern when the CICU is deactivated.

25. The apparatus according to claim 24, wherein:
the first contact pattern extends above and below an X axis by about 45 degrees both above and below on the left side of a Y axis of the combination image capturing apparatus, wherein the Y axis is formed perpendicular to the image capturing direction that is defined as the X axis;
the second contact pattern extends above and below an X axis by about 45 degrees both above and below on the right side of the Y axis of the combination image capturing apparatus;
the third contact pattern extends to the left and right of the Y axis above the X axis by about 45 degrees both to the left and the right side of the Y axis; and
the fourth contact pattern extends to the left and right of the Y axis below the X axis by about 45 degrees both to the left and the right side of the Y axis.

26. A combination image-capturing apparatus comprising:
a main body;
a main control unit;
a key input unit adapted to send to the main control unit a photo trigger signal to cause a video image signal or a still image signal to be stored;
a combination image-capturing unit (CICU), comprised of a digital still camera (DSC) and a digital video camera (DVC);
a mode switch unit, provided on the CICU; and
a DSC mode switch unit and a DVC mode switch unit, both adapted to rotate along with the mode switch unit and the CICU with respect to the main body to either a first or second region of operation, wherein a first set of signals is generated if CICU is rotated to the first region, and a second set of signals is generated if CICU is rotated to the second region, and each of the first set of signals and the second set of signals corresponds to one of DSC operating mode of CICU and DVC operating mode of CICU.

27. The combination image-capturing apparatus according to claim 26, wherein the first set of signals comprises:
a first binary signal value of one generated from a first contact pattern and a second binary signal value of zero generated from a second contact pattern when the CICU is operating in the DSC mode.

28. The combination image-capturing apparatus according to claim 26, wherein the second set of signals comprises:
a first binary signal value of zero generated from the first contact pattern and a second binary signal value of one generated from the second contact pattern when the CICU is operating in the DVC mode.

29. The combination image-capturing apparatus according to claim 26, wherein the main control unit is adapted to determine the operating mode of the CICA based on the first and second set of signals.

30. A combination image-capturing apparatus comprising:
a main body;
a main control unit;
a key input unit adapted to send to the main control unit a photo trigger signal to cause a video image signal or a still image signal to be stored;
a combination image-capturing unit (CICU), comprised of a digital still camera (DSC) and a digital video camera (DVC);
a mode switch unit, provided on the CICU; and
a DSC mode switch unit and a DVC mode switch unit, both adapted to rotate along with the mode switch unit to either a first or second region of operation, wherein a first set of signals is generated if rotated to the first region, and a second set of signals is generated if rotated to the second region;
wherein:
the first region of operation extends about the left side by about 45 degrees and right side by about 45 degrees of a Y axis of the combination image capturing unit below the X axis, wherein the Y axis is formed perpendicular to the image capturing direction that is defined as the X axis; and
the second region of operation extends about the left side by about 90 degrees of the Y axis of the combination image capturing unit below the X axis.

* * * * *